B. OWENS.
Mechanical Movement.

No. 197,287. Patented Nov. 20, 1877.

ATTEST: Sam H. Wright  
C. W. H. Brown

INVENTOR: Bernard Owens

UNITED STATES PATENT OFFICE.

BERNARD OWENS, OF ST. LOUIS, MISSOURI.

IMPROVEMENT IN MECHANICAL MOVEMENTS.

Specification forming part of Letters Patent No. 197,287, dated November 20, 1877; application filed October 1, 1877.

*To all whom it may concern:*

Be it known that I, BERNARD OWENS, of the city of St. Louis in the State of Missouri, have invented a certain new Improvement in Mechanical Movements, of which the following is a full, clear, and exact description, reference being had to the accompanying drawing, making part of this specification.

The first part of my improvement consists in providing a belt with a fixed or movable projection or wiper, which, in the revolution of the belt, will be brought in contact with an object, to give movement to the same.

The second part of my improvement consists in forming such belt elastic, so as to allow of its extension to lengthen the intervals between the action of the wiper or wipers on the belt.

The third part of my improvement consists in making such belt with an inelastic part, so that when the resistance to the action of the wiper is considerable the wiper may be sufficiently positive in its movement, which would not be the case if the part of the belt on which the strain is should be elastic.

The fourth part of my improvement consists in the combination of a belt, provided with a wiper or lug, with a belt-pulley made movable in the direction of the length of the belt, so as to fit the distance between the pulleys for a longer or shorter belt.

My invention also consists in certain appliances, set forth hereinafter, for conveying power to and from the wiper or projection on the belt.

Figure 1:
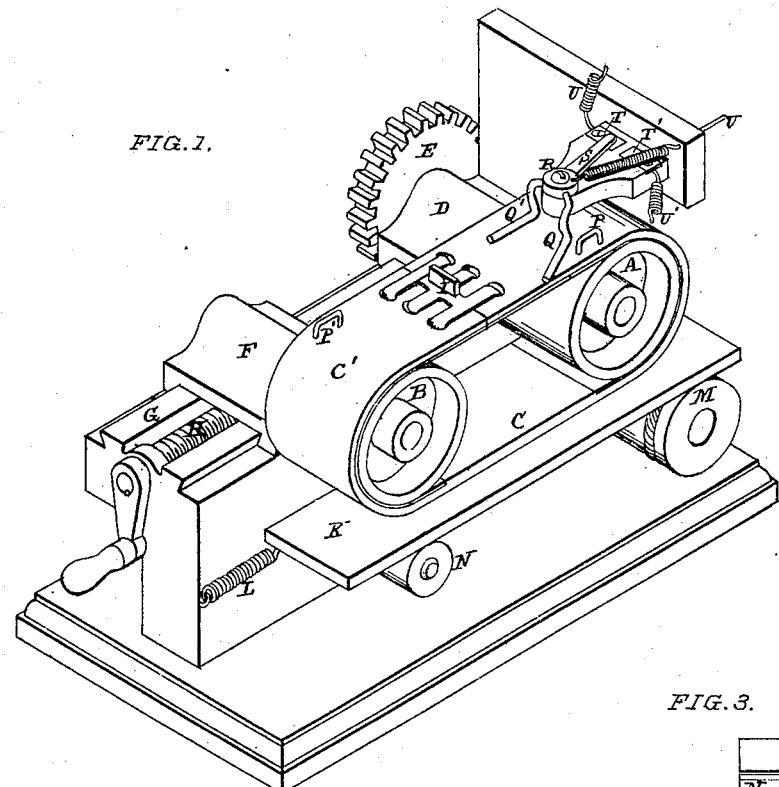
Figure 2:
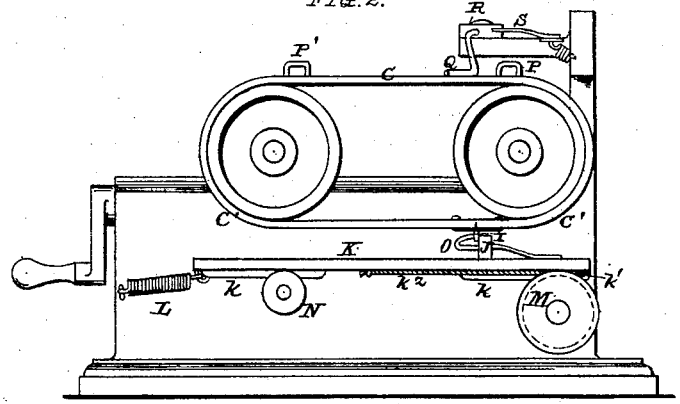
Figure 3:
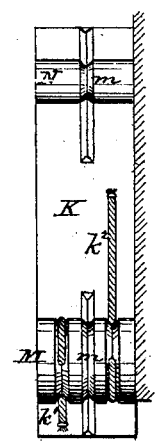

In the drawings, Figure 1 is a perspective view illustrating my invention. Fig. 2 is a side elevation of the same. Fig. 3 is a detail perspective view of a guide-roller supporting the reciprocating bar that is operated by the wiper.

A and B are two pulleys, around which passes a belt, C C', the part C being shown inelastic and the part C' elastic, so as to allow its elongation. A is the driving-pulley, and its shaft runs in fixed boxes D. Said shaft may carry a cog-wheel, E, or pulley, through which motion may be communicated to the shaft, or it may have rotation by any other means. The boxes F of the shaft of the pulley B are upon a carriage, G, which is capable of movement toward and from the boxes D, so as to suit the pulleys to carry a shorter or longer belt. The movement of the carriage may be by a screw, H, screwing in the carriage, or by other suitable means. The belt C may be made elastic, in the whole or in part, so as to avoid the necessity of changing the belt when the pulley B is moved nearer to or farther from the pulley A. I is a lug or wiper projecting from the belt, which, at each revolution of the belt, comes in contact with a lug or projection, J, upon the bar K, and gives to it a movement with the belt until, the wiper being raised by the passage of the belt up with the pulley A, the wiper is disengaged from the lug J and releases the bar K, which is then allowed to move in an opposite direction. This movement is accomplished by a spring, L, but may be accomplished by other means; for instance, the back movement of the bar K might be made positive by the action of the wiper in its return movement toward the pulley B. The bar K may be guided in any suitable manner. I have shown it resting on two guide-rollers, M and N, and connected to them by ribs $k$ on the bottom of the bar working in circumferential grooves $m$ of the rollers, and by two belts, $k^1$ and $k^2$, attached to the bar at one end, and coiled in the opposite directions upon the roller M, to which their ends are attached. O is a spring-catch, which works in a slot in the lug J, and whose hooked end is depressed by the wiper just before its contact with the lug, and on this contact taking place the catch springs up behind the wiper, and prevents the bar from being thrown forward by the blow of the wiper at a greater speed than the speed of the wiper.

The above shows one of the many purely mechanical applications of my device for causing an intermittent reciprocating movement, having a regular positive movement in one direction, and the intervals between the movements being regulated by the length of the belt.

I also show my device as applied to an electric circuit-breaker or switch. In this, as the force required is very small, I generally use removable staples P P', whose ends are sharpened, so as to enable them to be placed in the belt at any points and removed at will. These staples act (as the belt revolves) upon the arms Q Q' of the head R, from which the switch-arm S extends, so as to be brought in contact alternately with the plates T and T', which are insulated in any suitable manner, and from which extend conducting-wires U U$^1$ U$^2$, respectively—that is to say, from the oscillating head R and from the plates T and T'.

I claim herein as new and of my invention—

1. The combination, with the pulleys adjustable in distance asunder, of the belt with operating-wiper, substantially as set forth.

2. The combination of belt with wiper or lug I and the bar K, with lug or projection J, substantially as set forth.

3. The combination, with the wiper I and lug J, of the spring-catch O, substantially as set forth.

4. The combination of the pulleys A and B, made adjustable in distance from one another, and the belt made elastic to allow the distance movement in the pulleys.

5. The combination, in a belt passing around pulleys made adjustable in distance, of the inelastic portion C and elastic portion C', substantially as and for the purpose set forth.

BERNARD OWENS.

In presence of—
SAML. KNIGHT,
C. W. H. BROWN.